United States Patent
Kong et al.

(10) Patent No.: US 11,611,400 B2
(45) Date of Patent: Mar. 21, 2023

(54) ARRAY ANTENNA SYSTEM, AND CALIBRATION METHOD AND APPARATUS THEREOF

(71) Applicant: ELECTRONICS AND TELECOMMUNICATIONS RESEARCH INSTITUTE, Daejeon (KR)

(72) Inventors: Sunwoo Kong, Daejeon (KR); Kwang Seon Kim, Sejong-si (KR); Jeehoon Park, Daejeon (KR); Hui Dong Lee, Daejeon (KR); Seunghyun Jang, Daejeon (KR); Seok Bong Hyun, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 112 days.

(21) Appl. No.: 17/160,631

(22) Filed: Jan. 28, 2021

(65) Prior Publication Data
US 2021/0242948 A1    Aug. 5, 2021

(30) Foreign Application Priority Data
Jan. 30, 2020    (KR) .................. 10-2020-0011100

(51) Int. Cl.
| H04B 17/12 | (2015.01) |
| H01Q 3/26 | (2006.01) |
| H04B 17/14 | (2015.01) |
| H04B 17/21 | (2015.01) |

(52) U.S. Cl.
CPC ............ H04B 17/12 (2015.01); H01Q 3/267 (2013.01); H04B 17/14 (2015.01); H04B 17/21 (2015.01)

(58) Field of Classification Search
CPC ..................................................... H04B 17/12
See application file for complete search history.

(56) References Cited

U.S. PATENT DOCUMENTS

| 6,018,644 | A | * | 1/2000 | Minarik | ................ | H01Q 3/267 455/8 |
| 6,052,086 | A | * | 4/2000 | Kudoh | .................. | H01Q 23/00 343/700 MS |
| 6,157,340 | A | * | 12/2000 | Xu | ........................ | H04B 7/086 342/368 |
| 7,205,936 | B2 | | 4/2007 | Park et al. | | |
| 8,154,452 | B2 | | 4/2012 | Webb | | |

(Continued)

FOREIGN PATENT DOCUMENTS

| JP | 2018157533 A | * 10/2018 |
| KR | 10-2010-0102195 A | 9/2010 |

(Continued)

*Primary Examiner* — Hsinchun Liao
(74) *Attorney, Agent, or Firm* — LRK Patent Law Firm

(57) ABSTRACT

An array antenna system, and a calibration method and apparatus thereof are provided. The calibration method includes measuring a signal loop including mutual coupling between antennas included in an array antenna, calculating a ratio of a reception (RX) signal received by each antenna to an RX signal received by a reference antenna of the array antenna based on a result of the measuring, and performing calibration of the array antenna based on the ratio.

8 Claims, 13 Drawing Sheets

(56) References Cited

U.S. PATENT DOCUMENTS

| | | | |
|---|---|---|---|
| 8,477,866 B2 | 7/2013 | Lee et al. | |
| 9,246,530 B1 * | 1/2016 | Orlovsky | H04B 17/10 |
| 2013/0273860 A1 * | 10/2013 | Pehlke | H04B 1/44 |
| | | | 455/78 |
| 2015/0180111 A1 * | 6/2015 | Runyon | H01P 11/001 |
| | | | 333/137 |
| 2018/0316383 A1 * | 11/2018 | Kamgaing | H01Q 23/00 |

FOREIGN PATENT DOCUMENTS

| | | |
|---|---|---|
| KR | 10-1739957 B1 | 5/2017 |
| KR | 10-1785980 B1 | 10/2017 |
| KR | 10-2019-0133386 A | 12/2019 |

\* cited by examiner

ARRAY ANTENNA SYSTEM, AND CALIBRATION METHOD AND APPARATUS THEREOF

CROSS-REFERENCE TO RELATED APPLICATION(S)

This application claims the benefit of Korean Patent Application No. 10-2020-0011100 filed on Jan. 30, 2020, in the Korean Intellectual Property Office, the disclosure of which is incorporated herein by reference for all purposes.

BACKGROUND

1. Field of the Invention

The following example embodiments relate to an array antenna system, and a calibration method and apparatus thereof.

2. Description of Related Art

In a wireless communication system, an antenna gain may be increased by an adaptive array antenna system that allows an antenna beam to be adaptively directed in a desired direction using an array antenna, thereby enhancing a signal-to-noise ratio.

In addition, an adaptive array antenna system implemented by a digital beamforming method to simultaneously transmit and receive several different types of signals, such as a mobile communication base station system, may have an effect of reducing interference with other signals, because independent antenna beams are formed for each signal.

By a digital beamforming scheme, a directional angle of an array antenna is controlled by multiplying a received or transmitted signal by a beamforming weight in a baseband. Accordingly, to accurately control the directional angle of the array antenna, it is necessary to accurately estimate and calibrate a transfer function of a receiver or a transmitter.

In general, a transfer function of a transceiver expressed in terms of a size and a phase has different values for each channel due to a characteristic of a radio frequency (RF) component. Thus, there is a demand for an error calibration process of periodically measuring and calibrating the transfer function.

SUMMARY

Example embodiments may provide a technology for efficiently performing calibration of an array antenna system.

According to an aspect, there is provided an array antenna calibration method including measuring a signal loop including mutual coupling between antennas included in an array antenna, calculating a ratio of a reception (RX) signal received by each antenna to an RX signal received by a reference antenna of the array antenna based on a result of the measuring, and performing calibration of the array antenna based on the ratio.

The measuring may include measuring a signal loop including an antenna connected to a transceiver in a transmission (TX) mode and an antenna connected to a transceiver in an RX mode.

The array antenna may include a first antenna, a second antenna, a third antenna, and a fourth antenna. The measuring may include measuring a first signal loop and a second signal loop in which the second antenna and the third antenna receive signals transmitted by the first antenna through mutual coupling, and measuring a third signal loop and a fourth signal loop in which the second antenna and the third antenna receive signals transmitted by the fourth antenna through mutual coupling. The calculating may include calculating a ratio of an RX signal received by the third antenna to an RX signal received by the second antenna based on results of the measuring of the first signal loop through the fourth signal loop.

The performing may include performing calibration of an amplitude based on the ratio and performing calibration of a phase based on the ratio.

The performing may include performing row calibration of antennas of each of rows in the array antenna based on a first antenna of each of the rows, and performing column calibration of first antennas of the rows.

According to another aspect, there is provided an array antenna calibration apparatus including a processor configured to measure a signal loop including mutual coupling between antennas included in an array antenna, and to calculate a ratio of an RX signal received by each antenna to an RX signal received by a reference antenna of the array antenna based on a result of the measuring, and a calibration circuit configured to perform calibration based on the ratio.

The processor may be configured to measure a signal loop including an antenna connected to a transceiver in a TX mode and an antenna connected to a transceiver in an RX mode.

The array antenna may include a first antenna, a second antenna, a third antenna, and a fourth antenna. The processor may be configured to measure a first signal loop and a second signal loop in which the second antenna and the third antenna receive signals transmitted by the first antenna through mutual coupling, to measure a third signal loop and a fourth signal loop in which the second antenna and the third antenna receive signals transmitted by the fourth antenna through mutual coupling, and to calculate a ratio of an RX signal received by the third antenna to an RX signal received by the second antenna based on results obtained by measuring the first signal loop through the fourth signal loop.

The calibration circuit may include a gain/attenuator circuit configured to perform calibration of an amplitude based on the ratio, and a phase shifter configured to perform calibration of a phase based on the ratio.

The calibration circuit may be configured to perform row calibration of antennas of each of rows in the array antenna based on a first antenna of each of the rows, and to perform column calibration of first antennas of the rows.

According to another aspect, there is provided an array antenna system including a plurality of transceiver units arranged in a form of a lattice, wherein each of the plurality of transceiver units includes a plurality of antennas arranged in a form of a lattice, and a transceiver.

The transceiver may include a plurality of switches configured to select a path connected to each of the antennas, and a power combiner configured to combine selected paths.

The plurality of antennas may include patch antennas arranged at vertices of the array antenna system.

Each of the plurality of transceiver units may include a TX port and an RX port. The array antenna system may further include a first power combiner configured to combine TX ports of each of the plurality of transceiver units, and a second power combiner configured to combine RX ports of each of the plurality of transceiver units.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Figure 1:
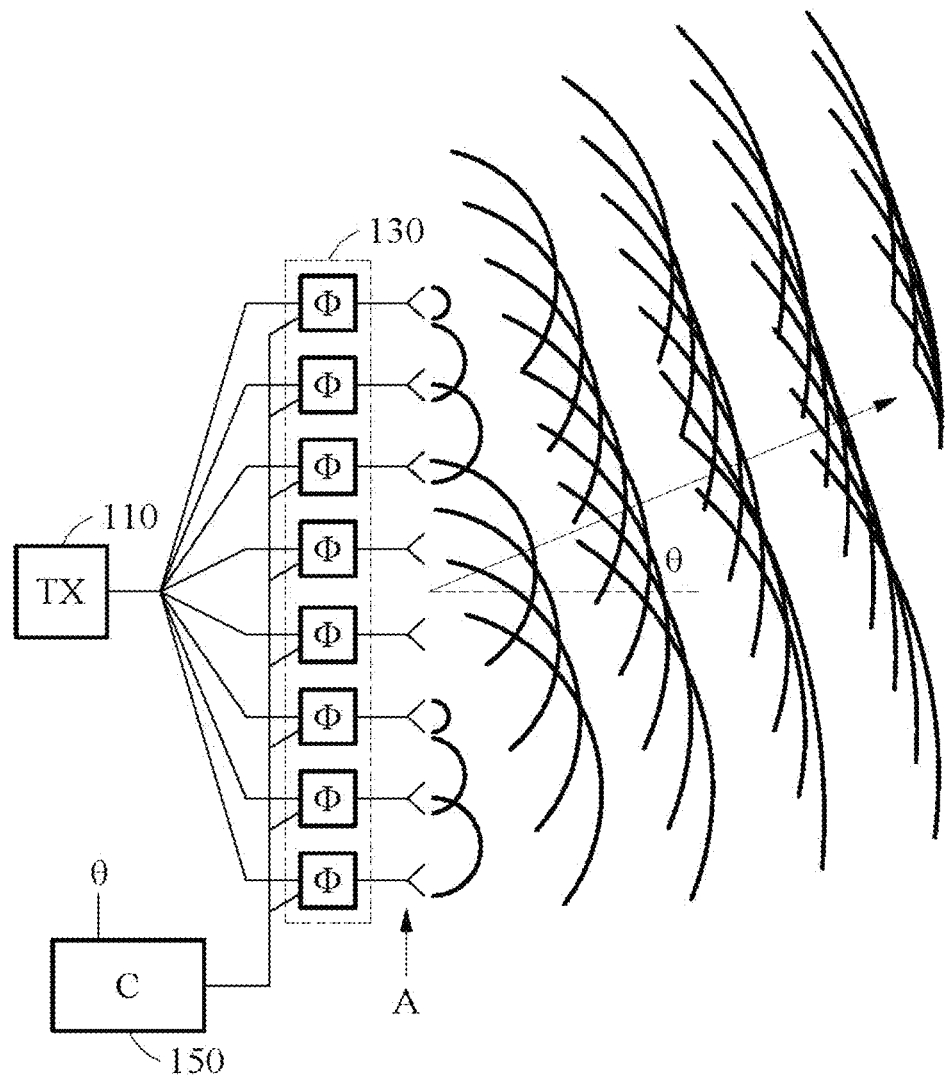
FIG. 1 is a diagram illustrating a general phased array antenna.

Hereinafter, example embodiments will be described in detail with reference to the accompanying drawings. Various modifications may be made to example embodiments. However, it should be understood that these embodiments are not construed as limited to the illustrated forms and include all changes, equivalents or alternatives within the idea and the technical scope of this disclosure.

The terminology used herein is for the purpose of describing particular example embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although terms of "first" or "second" are used to explain various components, the components are not limited to the terms. These terms are used only to distinguish one component from another component. For example, a "first" component may be referred to as a "second" component, or similarly, the "second" component may be referred to as the "first" component within the scope of the right according to the concept of the example embodiments.

Unless otherwise defined, all terms including technical and scientific terms used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the example embodiments with reference to the accompanying drawings, like reference numerals refer to like constituent elements and a repeated description related thereto will be omitted. In the description of example embodiments, detailed description of well-known related structures or functions will be omitted when it is deemed that such description will cause ambiguous interpretation of the present disclosure.

FIG. 1 is a diagram illustrating a general phased array antenna.

The phased array antenna may include a transmitter 110, a plurality of antennas 130 and a phase shifter 150.

The plurality of antennas 130 may be arranged at regular intervals. For example, the antennas 130 may be arranged in an array with regular intervals, for example, $\lambda/2$.

The plurality of antennas 130 may be connected to the phase shifter 150. Here, a configuration in which each of the antennas 130 is connected to the phase shifter 150 may be referred to as a "channel".

The plurality of antennas 130 may be connected to the transmitter 110. For example, the plurality of antennas 130 may be connected to a common port through a power divider.

When the transmitter 110 transmits a signal to the common port, the signal may be transmitted to each channel through the power divider. Here, the phase shifter 150 may delay a phase of the signal based on a value set for each channel, and the signal with the delayed phase may be radiated through an antenna 130.

A phase delay setting value of the phase shifter 150 may be determined based on a wavelength of the radiated signal and a gap between the plurality of antennas 130. For example, the phase delay setting value may be set to a value at which a null and a peak of a wavelength match in a specific direction.

The phase delay setting value may be set on the premise that amplitude and phase values of channels are the same. However, amplitudes and phases for each channel may be different from each other in an actual implementation example.

Thus, a calibration operation to equalize amplitude and phase values for each channel may be required.

Figure 2:
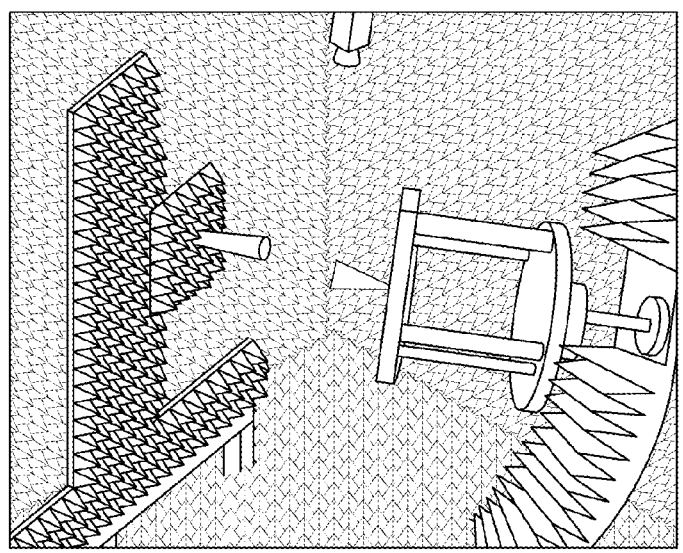
FIGS. 2 through 4 are diagrams illustrating a calibration method of an array antenna system according to a related art.
Figure 3A:
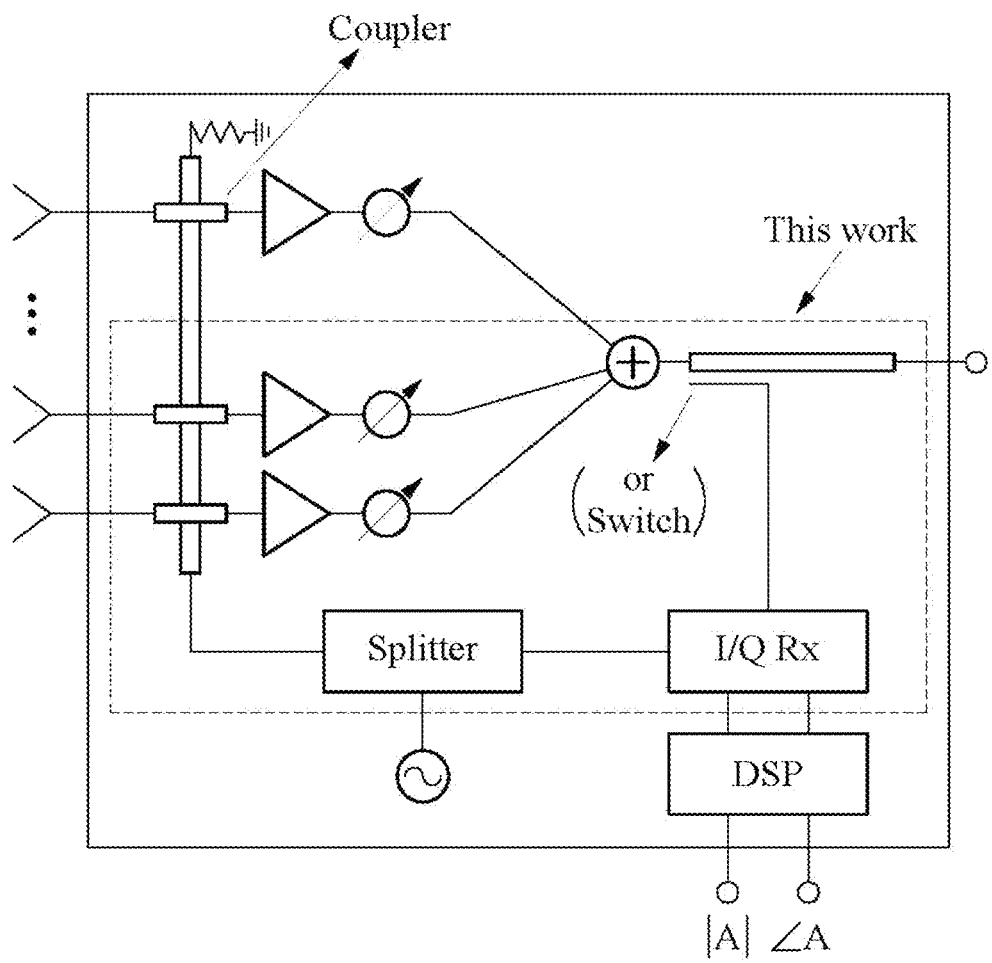
Figure 3B:
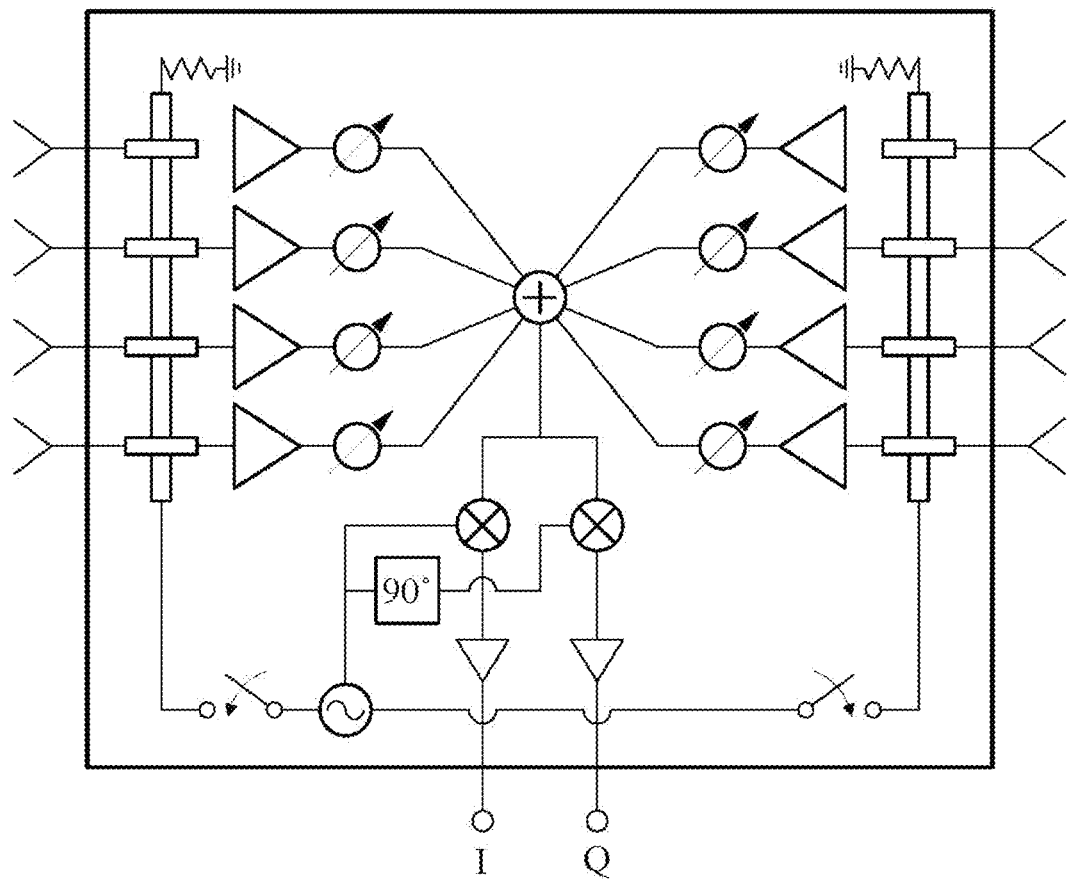
Figure 4:
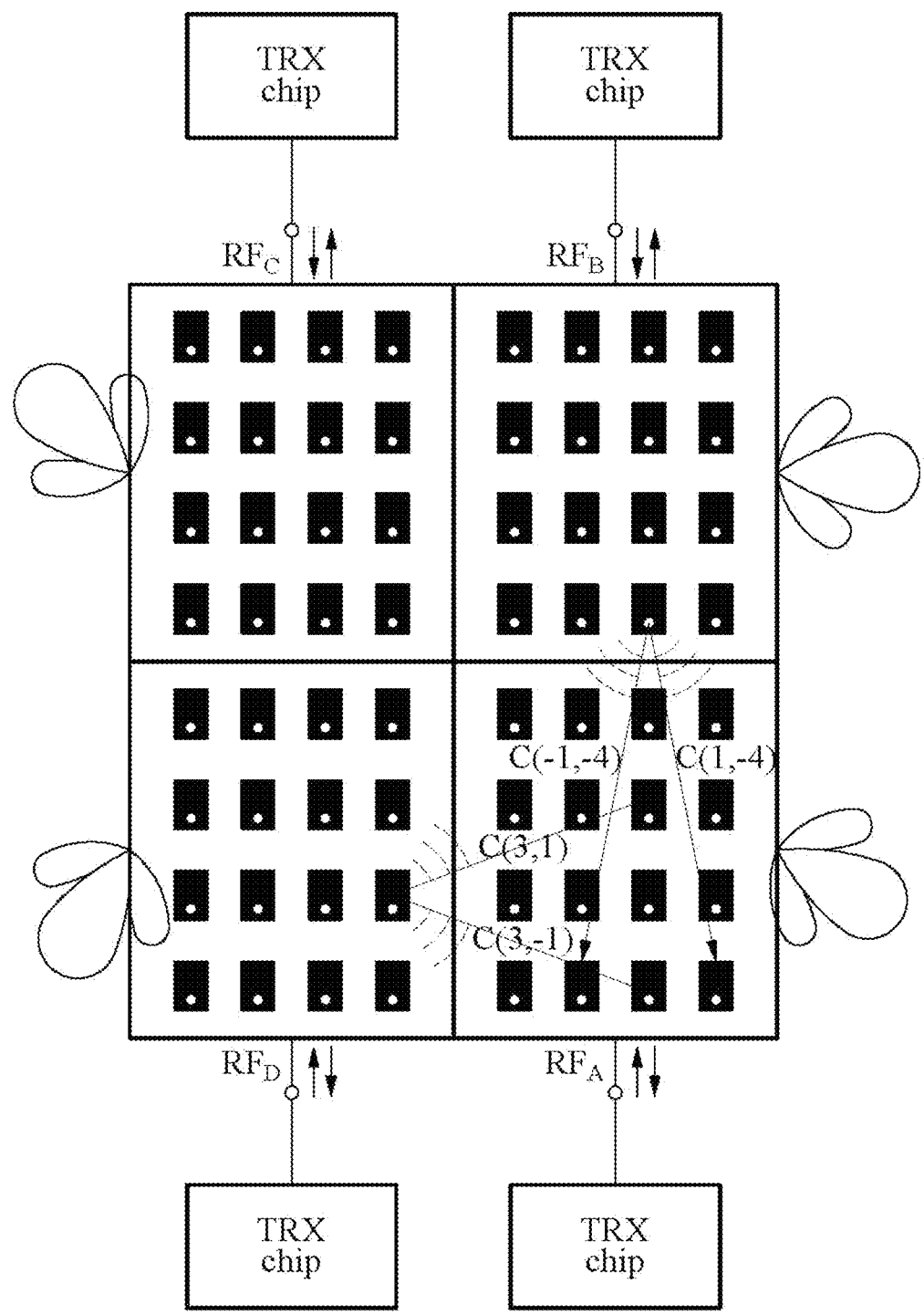

FIGS. 2 through 4 are diagrams illustrating a calibration method of an array antenna system according to a related art.

FIG. 2 illustrates calibration through a measurement of a chamber in which radio signals are controlled. The measurement of the chamber may be performed by fixing an array antenna while a detector is mechanically moving. For example, the detector may be moved to a central position in a space of an antenna beam of an active channel and may measure a reception (RX) signal for a transmission (TX) signal. In this example, channels other than the active channel may be set to be in an off state.

However, the above calibration scheme through a chamber measurement requires a high cost and it is impossible to perform the calibration scheme in-situ.

FIGS. 3A and 3B illustrate built-in self-test (BIST) structures. A BIST structure may be in a form of adding a calibration path inside a phased array antenna chip.

The BIST structure may include a calibration input port with a coupler structure to apply a test pilot signal for each channel. Here, a source signal for calibration may be applied to each channel, and an output signal may be obtained by mixing the source signal and a signal that is output by allowing the source signal to pass through a channel.

In the BIST structure, channels other than an active channel may be in an off state, a characteristic of a single channel may be measured, and amplitudes and phases for each channel may be measured.

However, a calibration scheme in the BIST structure may be inefficient in view of a cost, because an area of a chip is used. Also, the calibration scheme may have an influence on performance of a front-end module (FEM) and a BIST path may need to be implemented in a single die.

In addition, in the BIST structure, when a number of channels increases, an accuracy of calibration may decrease.

FIG. 4 illustrates a quadrant based self-test and self-calibration (Quad-BIST) structure. In the Quad-BIST structure, calibration may be performed using mutual coupling between patch antennas that are two-dimensionally arranged.

The calibration of the Quad-BIST structure may require hardware for a multiple-input multiple-output (MIMO) operation. The Quad-BIST structure may require a quad configuration to perform calibration for all channels.

In FIG. 4, four transceivers (TRX), each including "4×4" antennas, may be used.

Among four types of phased array antennas with the Quad-BIST structure, for example, $RF_A$, $RF_B$, $RF_C$, and $RF_D$, $RF_B$ and $RF_D$ may transmit signals to perform calibration of $RF_A$, and $RF_A$ may receive a mutual coupling signal generated between antenna elements.

Calibration may be performed by comparing a signal received by a reference antenna element to a signal received by another antenna element. For example, an amplitude and a phase signal of each antenna element may be obtained to perform calibration.

Since a MIMO operation is necessary for a calibration scheme using the Quad-BIST structure, MIMO hardware and four transceivers may be required and may need to be located in a single plane despite the MIMO operation.

Figure 5:
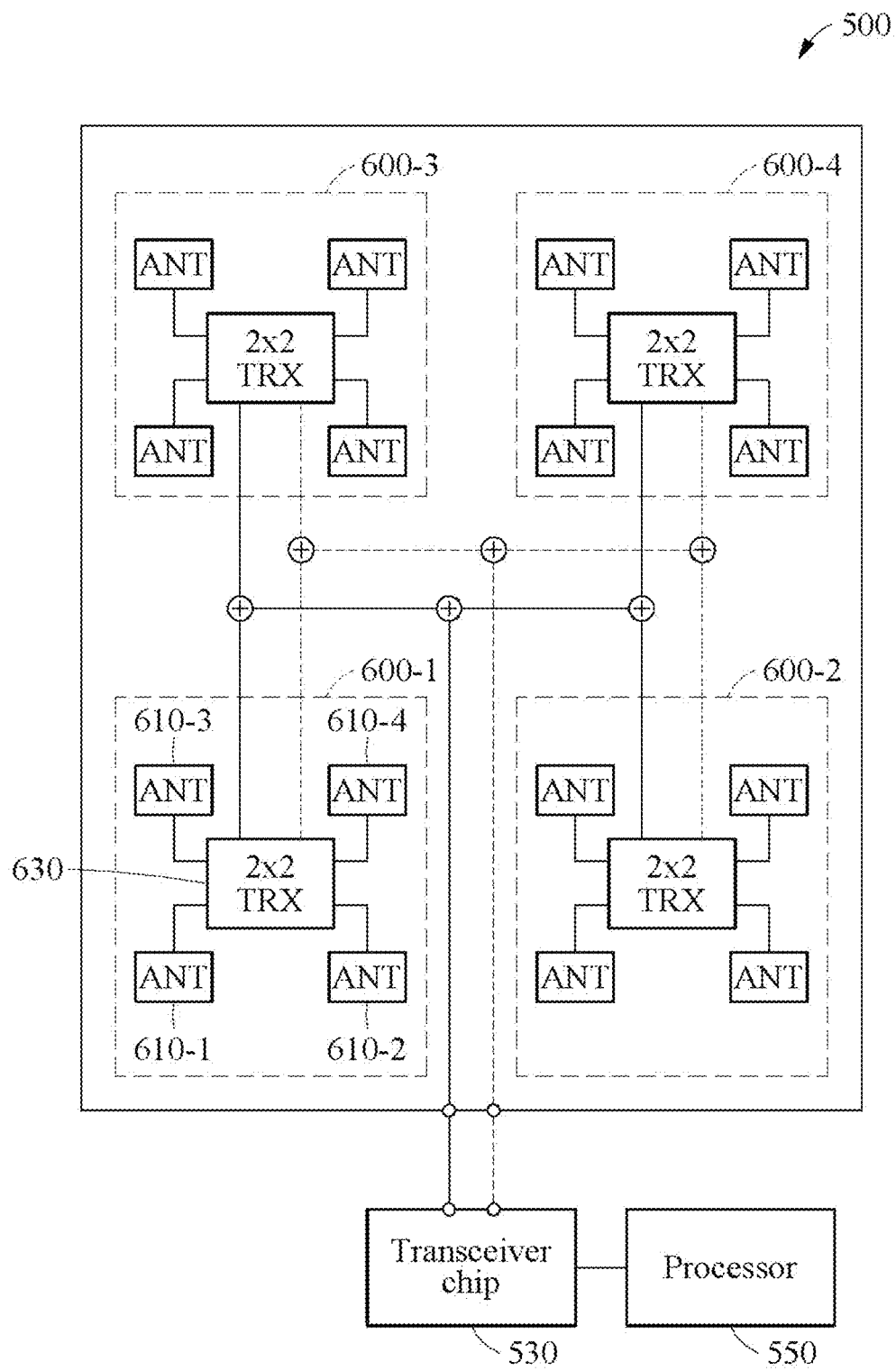
FIG. 5 is a diagram illustrating an array antenna system according to an example embodiment.
Figure 6:
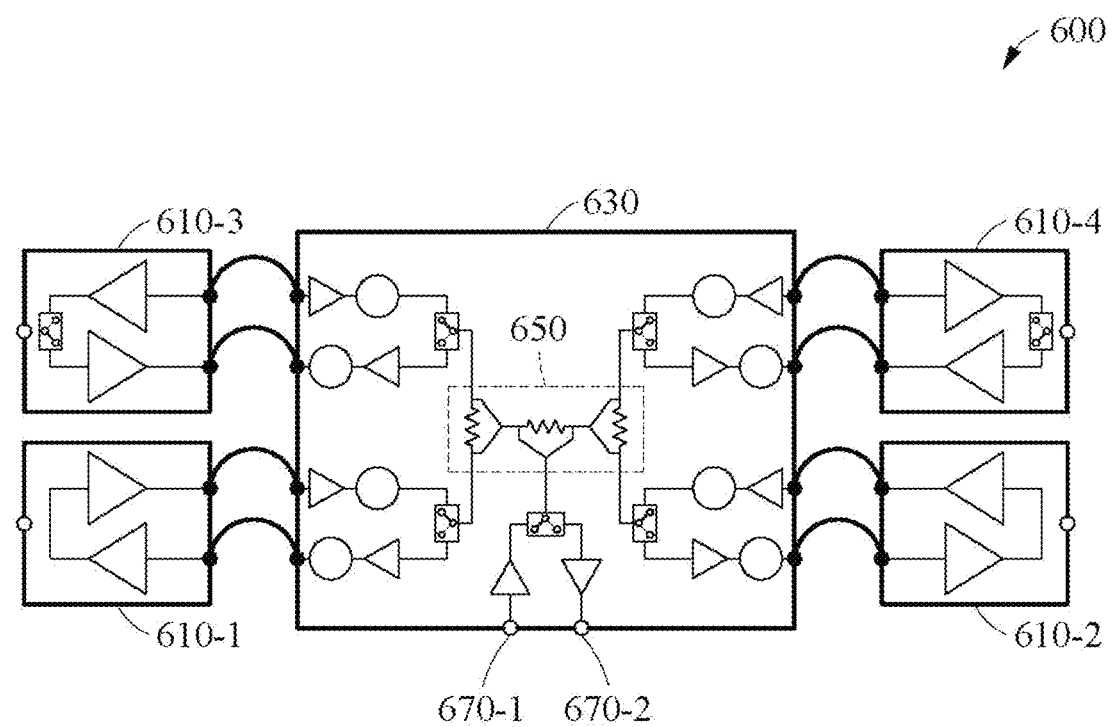
FIG. 6 is a diagram illustrating an example of a transceiver unit of FIG. 5.

FIG. 5 is a diagram illustrating an array antenna system according to an example embodiment, and FIG. 6 is a diagram illustrating an example of a transceiver unit of FIG. 5.

An array antenna system 500 may include a transceiver chip 530, a processor 550, and transceiver units 600-1 through 600-4. For example, the processor 550 may be a baseband (BB) processor.

The array antenna system 500 of FIG. 5 may include the transceiver units 600-1 through 600-4 arranged in a lattice form. A size of the array antenna system 500 may be adjusted based on a number of transceiver units, for example, the transceiver units 600-1 through 600-4.

Each of the transceiver units 600-1 through 600-4 may include a plurality of antennas, for example, antennas 610-1 through 610-4, and a transceiver 630, for example, a 2×2 TRX.

The array antenna system 500 is illustrated as a 4×4 array antenna system including four transceiver units, for example, the transceiver units 600-1 through 600-4, in FIG. 5, however, there is no limitation thereto.

The transceiver 630 may include a power combiner 650. The power combiner 650 may combine paths connected to the antennas 610-1 through 610-4 and connect the paths to a common TX port 670-1 and a common RX port 670-2.

For example, the power combiner 650 may combine four channels using the common TX port 670-1 and the common RX port 670-2.

The transceiver 630 may set each of the antennas 610-1 through 610-4 to be in a TX mode or an RX mode using a switch. For example, the transceiver 630 may change a path connected to each of the antennas 610-1 through 610-4 to a TX path or an RX path using the switch.

The common TX port 670-1 and the common RX port 670-2 may be included. The transceiver 630 may select a path combined by the power combiner 650 using the switch so that the path may be connected to the common TX port 670-1 and the common RX port 670-2.

A transceiver 600 of FIG. 6 may be configured to perform calibration even when a compound device low noise amplifier (LNA) and paging amplifier system in package (PA SiP), is configured for performance improvement.

The transceiver units 600-1 through 600-4 may be combined by the power combiner 650 and may be connected to the transceiver chip 530. Here, the transceiver units 600-1 through 600-4 may be coupled to each of the common TX port 670-1 and the common RX port 670-2, to be connected to the transceiver chip 530.

The transceiver units 600-1 through 600-4 may be connected via two paths to the transceiver chip 530. The common TX port 670-1 and the common RX port 670-2 of the transceiver units 600-1 through 600-4 may be connected via different paths to the transceiver chip 530.

For example, common TX port 670-1 of each of the transceiver units 600-1 through 600-4 may be combined by a first power combiner and may be connected to the transceiver chip 530, and common RX port 670-2 of each of the transceiver units 600-1 through 600-4 may be combined by a second power combiner and may be connected to the transceiver chip 530.

Figure 7:
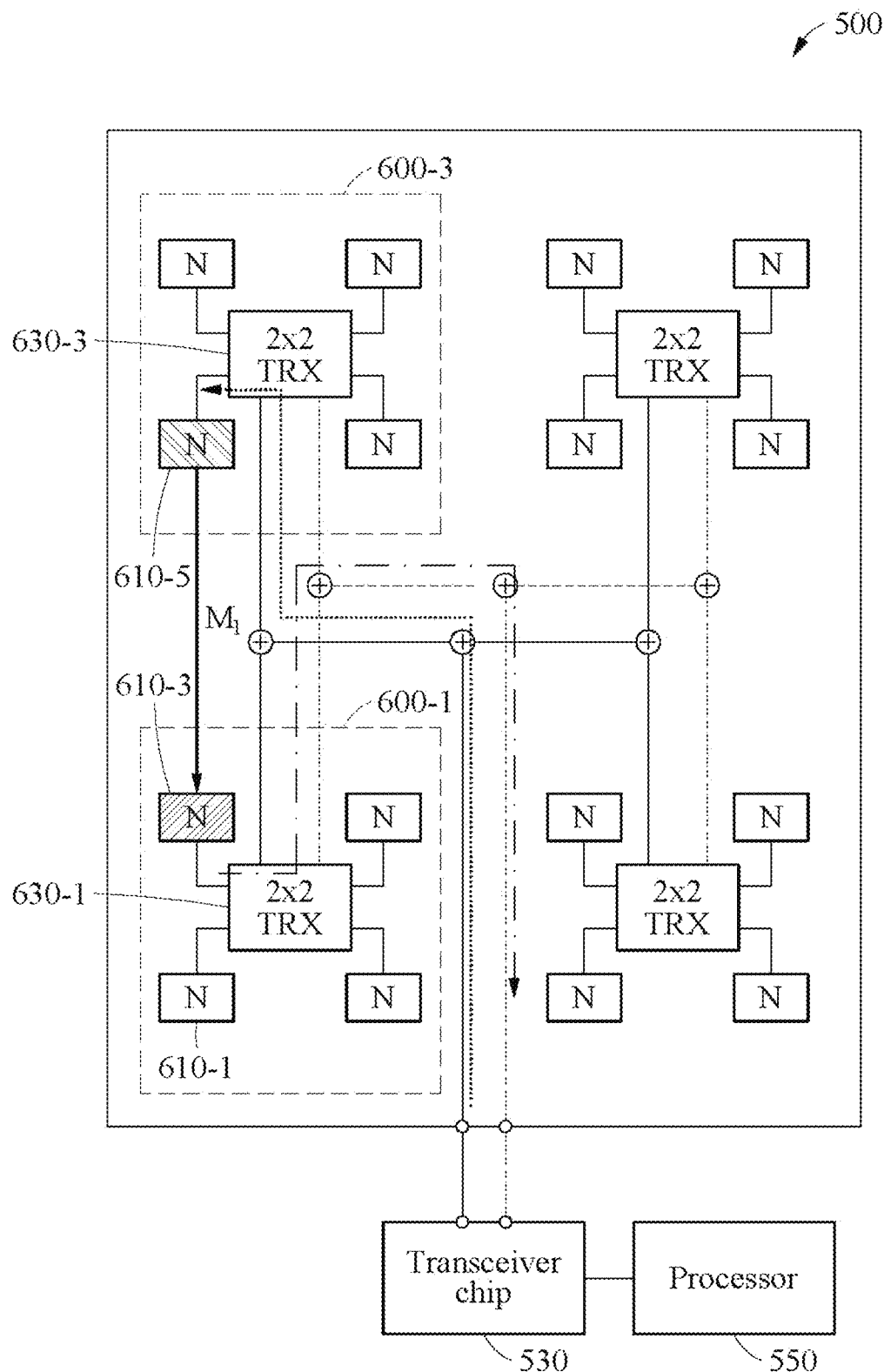
FIG. 7 is a diagram illustrating a signal loop including mutual coupling between antennas of the array antenna system of FIG. 5.

FIG. 7 is a diagram illustrating a signal loop including mutual coupling between antennas of the array antenna system 500 of FIG. 5.

The processor 550 may perform calibration based on a signal loop through the mutual coupling between the antennas.

The processor 550 may measure the signal loop through the mutual coupling between the antennas.

The signal loop may include a TX antenna included in one transceiver unit, and an RX antenna included in another transceiver unit. Here, a TX antenna 610-5 and an RX antenna 610-3 may be located adjacent to each other and may be mutually coupled.

For convenience of description, as shown in FIG. 7, it is assumed that the transceiver unit 600-3 is in a TX mode, that the transceiver unit 600-1 is in an RX mode, and that the TX antenna 610-5 and the RX antenna 610-3 are included in the transceiver unit 600-3 and the transceiver unit 600-1, respectively.

Here, channels of antennas other than the RX antenna 610-3 and the TX antenna 610-5 may be in the off state.

Also, for convenience of description, a position of each antenna may be specified based on an x-y axis coordinate system in which a lower left end is set to (1, 1) and an upper right end is set to (4, 4).

A signal loop $T_1$ measured by the processor 550 may be represented as shown in Equation 1 below. Here, mutual coupling $M_1$ and $M_2$ may be determined based on a distance between antennas.

$$T_1(t(1,3) \rightarrow r(1,2)) = t(1,3) M_1 r(1,2) \quad \text{[Equation 1]}$$

In Equation 1, $M_1$ denotes mutual coupling between the TX antenna 610-5 and the RX antenna 610-3, t(1,3) denotes a TX signal of the TX antenna 610-5, and r(1,2) denotes an RX signal of the RX antenna 610-3.

Figure 8A:
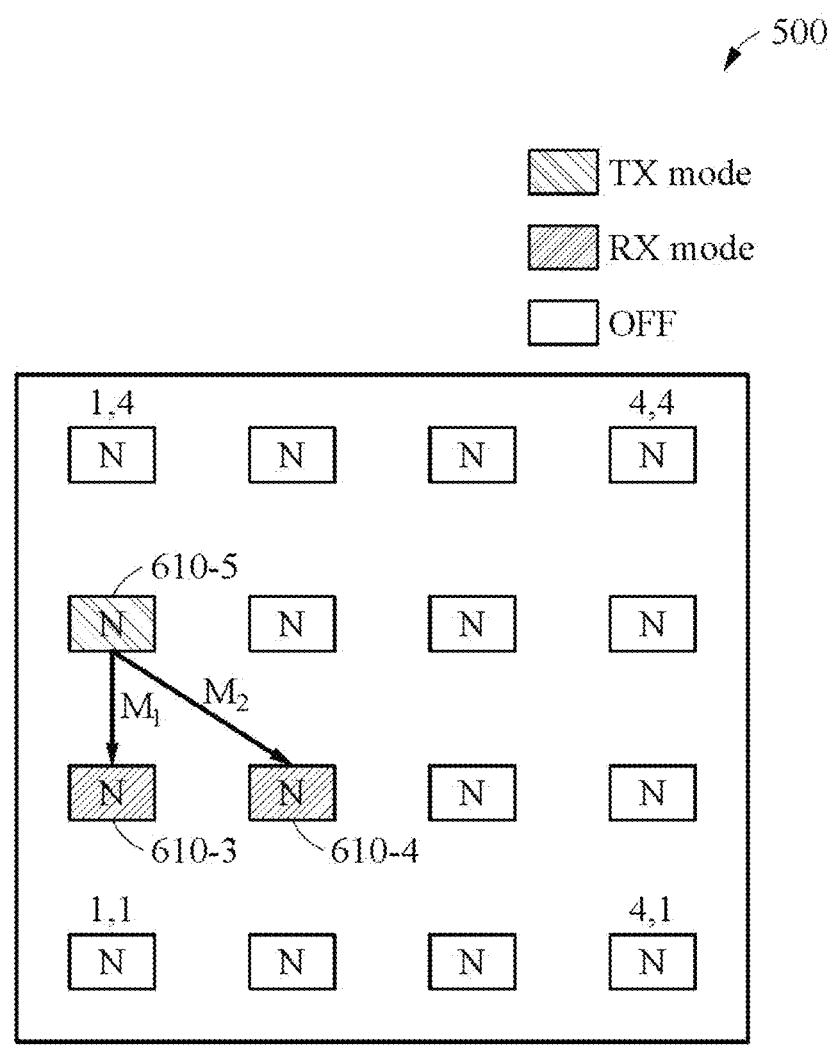
FIGS. 8A and 8B illustrate methods of comparing an amplitude and a phase between neighboring antennas in the array antenna system of FIG. 5.
Figure 8B:
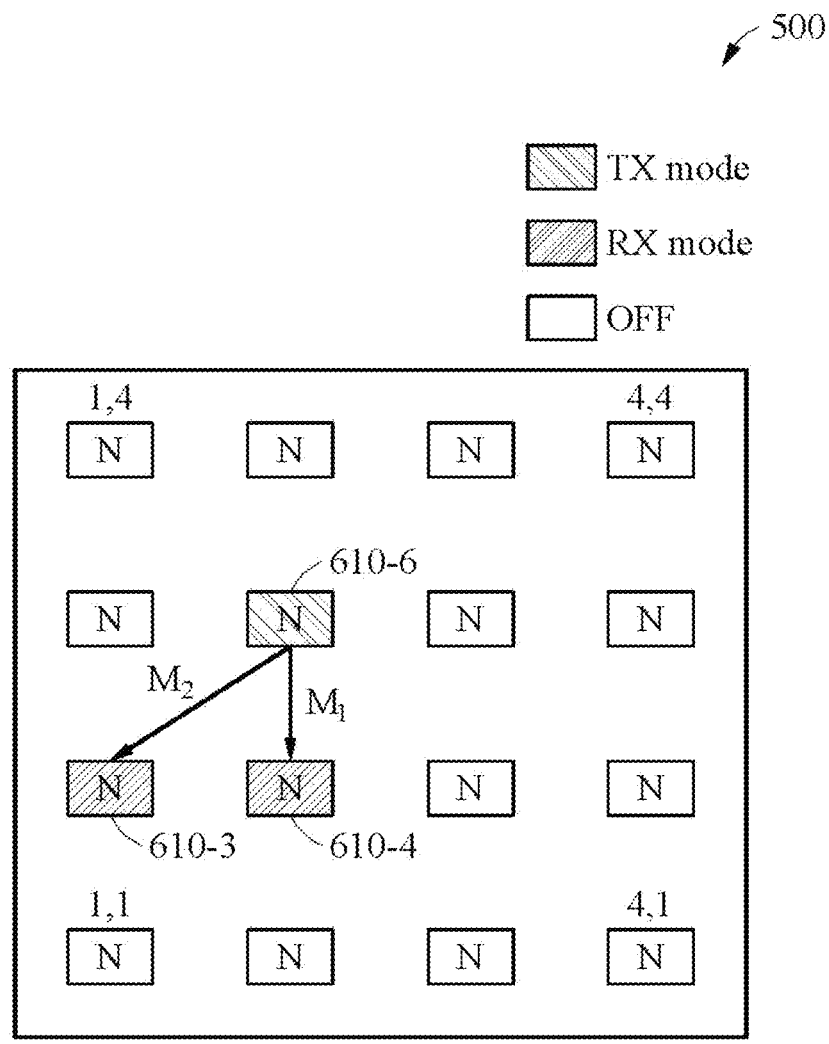

FIGS. 8A and 8B illustrate methods of comparing an amplitude and a phase between neighboring antennas in the array antenna system 500 of FIG. 5.

The processor 550 may calculate a ratio between RX signals received by two neighboring antennas based on a signal loop measurement result. For example, the processor 550 may measure four loops that may be obtained by combining two neighboring TX antennas and two neighboring RX antennas, and may calculate a ratio between RX signals received by two neighboring antennas.

For convenience of description, it is assumed that signals are transmitted by two TX antennas, for example, TX antennas 610-5 and 610-6, and that signals are received by two RX antennas, for example, the RX antennas 610-3 and 610-4.

The signal loop $T_1$ including the TX antenna 610-5 and the RX antenna 610-3 may be represented as shown in Equation 1 above, and a signal loop $T_2$ including the TX antenna 610-5 and the RX antenna 610-4 may be represented as shown in Equation 2 below.

$$T_2(t(1,3) \to r(2,2)) = t(1,3) M_2 r(2,2) \quad \text{[Equation 2]}$$

In Equation 2, $M_2$ denotes mutual coupling between the TX antenna 610-5 and the RX antenna 610-4, t(1,3) denotes a TX signal of the TX antenna 610-5, and r(2,2) denotes an RX signal of the RX antenna 610-4.

A signal loop $T_3$ including the TX antenna 610-6 and the RX antenna 610-3 may be represented as shown in Equation 3 below, and a signal loop $T_4$ including the TX antenna 610-6 and the RX antenna 610-4 may be represented as shown in Equation 4 below.

$$T_3(t(2,3) \to r(1,2)) = t(2,3) M_2 r(1,2) \quad \text{[Equation 3]}$$

In Equation 3, $M_2$ denotes mutual coupling between the TX antenna 610-6 and the RX antenna 610-3, t(2,3) denotes a TX signal of the TX antenna 610-6, and r(1,2) denotes an RX signal of the RX antenna 610-3.

$$T_4(t(2,3) \to r(2,2)) = t(2,3) M_1 r(2,2) \quad \text{[Equation 4]}$$

In Equation 4, $M_1$ denotes mutual coupling between the TX antenna 610-6 and the RX antenna 610-4, t(2,3) denotes a TX signal of the TX antenna 610-6, and r(2,2) denotes an RX signal of the RX antenna 610-4.

The processor 550 may calculate a ratio between the RX signal of the RX antenna 610-3 and the RX signal of the RX antenna 610-4, based on measurement results of the four signal loop $T_1$ to $T_4$, as shown in Equation 5 below.

$$\frac{r(2.2)}{r(1.2)} = \sqrt{\left(\frac{T_2}{T_1} \frac{T_1}{T_3}\right)} = A e^{j\omega\theta} \quad \text{[Equation 5]}$$

In Equation 5, A denotes an amplitude gain and $\theta$ denotes a phase difference.

The processor 550 may calculate a ratio between RX signals of corresponding RX antennas in the same manner while changing combinations of two TX antennas and two RX antennas. For example, the processor 550 may represent a ratio of signals of "16" antennas with respect to a single reference antenna.

The array antenna system 500 may perform calibration based on a ratio between RX signals.

All antennas, for example, the antennas 610-1 through 610-6, included in the array antenna system 500 may be connected to a calibration circuit (not shown). The calibration circuit may perform calibration based on a ratio between RX signals.

The calibration circuit may include a gain/attenuator circuit and a phase shifter.

The gain/attenuator circuit may adjust an amplitude gain of each of the antennas, and the phase shifter may adjust a phase of each of the antennas.

For example, the gain/attenuator circuit may adjust the amplitude gain of each of the antennas in a ratio of 1/A based on an amplitude gain A obtained based on a ratio between RX signals. The phase shifter may adjust the phase by a phase difference $\theta$ obtained based on the ratio between RX signals.

Figure 9:
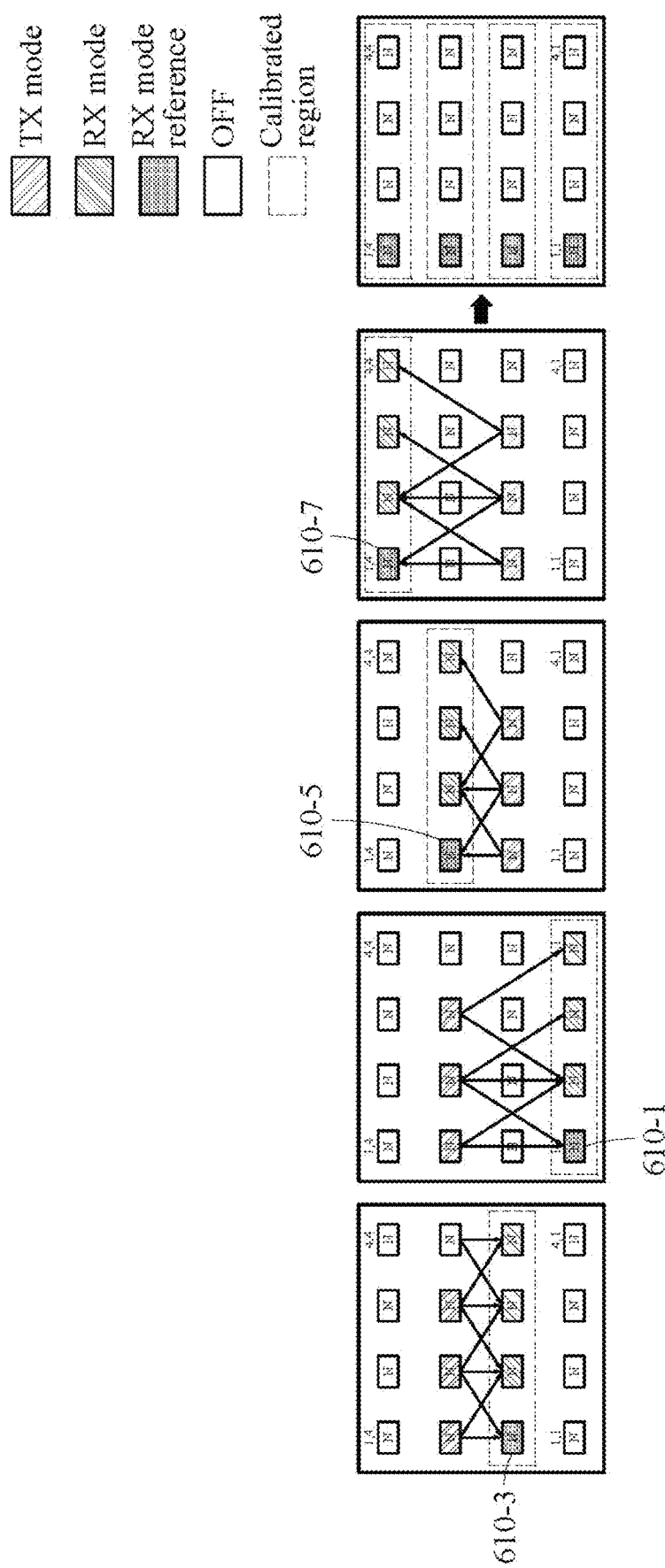
FIG. 9 is a diagram illustrating a row calibration operation for the array antenna system of FIG. 5.
Figure 10:
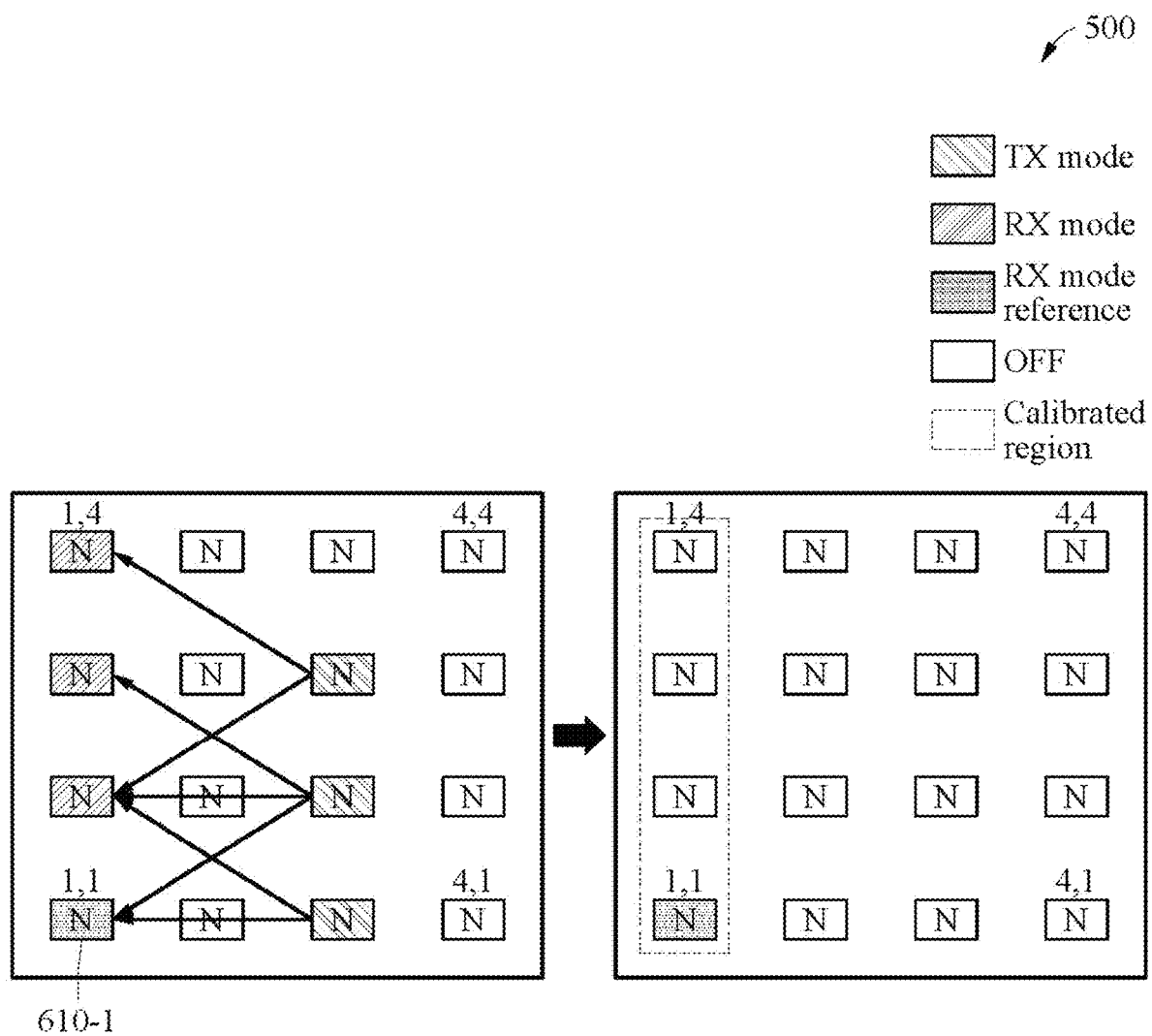
FIG. 10 is a diagram illustrating a column calibration operation for the array antenna system of FIG. 5.
Figure 11:
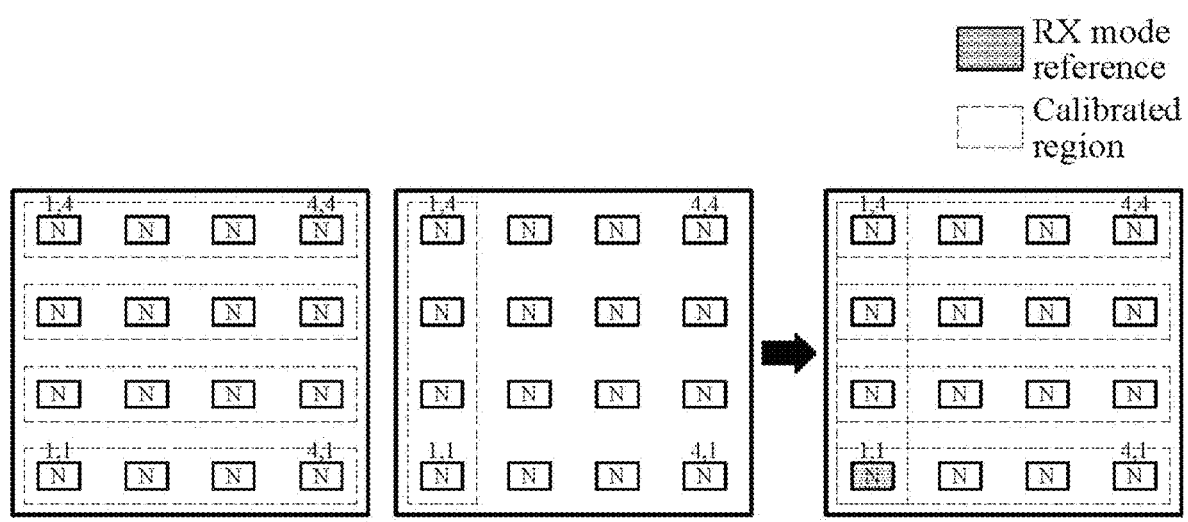
FIG. 11 is a diagram illustrating a calibration operation for the entire array antenna system of FIG. 5.

FIG. 9 is a diagram illustrating a row calibration operation for the array antenna system 500 of FIG. 5, FIG. 10 is a diagram illustrating a column calibration operation for the array antenna system 500, and FIG. 11 is a diagram illustrating a calibration operation for the entire array antenna system 500.

The array antenna system 500 may perform row calibration of antennas arranged in the same row. For example, the array antenna system 500 may perform calibration for each row based on first antennas 610-1, 610-3, 610-5, and 610-7 of each row.

The array antenna system 500 may perform column calibration of antennas arranged in the same column. For example, the array antenna system 500 may perform calibration of a first column based on the first antenna 610-1 of a first column.

The array antenna system 500 may perform calibration of all the antennas through an intersection of the row calibration and the column calibration.

For example, the array antenna system 500 may perform row calibration for each row, and may perform column calibration of the first column in which the first antennas 610-1, 610-3, 610-5, and 610-7 used as a criterion for the row calibration are arranged.

The array antenna system 500 may perform calibration at a low cost and in-situ.

Since an area of an additional chip is not used and there is no additional monitoring point in an input/output end of an FEM, the array antenna system 500 may perform calibration without having an influence on performance of the FEM.

The array antenna system 500 may apply an additional power amplifier (PA), an LNA, and the like that uses a compound to enhance the performance of the FEM. Calibration performance may remain unchanged even though the number of channels increases.

Analog beamforming (BF) of a single input/output may be possible for a calibration operation of the array antenna system 500, and BB digital hardware supporting a MIMO operation may not be required.

The array antenna system 500 may require a single transceiver, and may not require an area that may maximize an advantage of a MIMO in a configuration in which the same size as that of a terminal is important.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to the above-described example embodiments may be recorded in non-transitory computer-readable media including program instructions to implement various operations which may be performed by a computer. The media may also include, alone or in combination with the program instructions, data files, data structures, and the like. The program instructions recorded on the media may be those specially designed and constructed for the purposes of the example embodiments, or they may be of the well-known kind and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as code produced by a compiler, and files containing higher level code that may be executed by the computer using an interpreter. The described hardware devices may be configured to act as one or more software modules in order to perform the operations of the above-described example embodiments, or vice versa.

Software may include a computer program, a piece of code, an instruction, or some combination thereof, to independently or collectively instruct or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

While this disclosure includes example embodiments, it will be apparent to one of ordinary skill in the art that various changes in form and details may be made in these example embodiments without departing from the spirit and scope of the claims and their equivalents. The example embodiments described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An array antenna calibration system comprising:
    a plurality of transceiver units each including:
        a common transmission (TX) port and a common reception (RX) port,
        a plurality of antennas arranged in a lattice form, and
        a transceiver,
    wherein the plurality of transceiver units are arranged in a lattice form, and adjacent ones of the plurality of transceiver units are mutually coupled to each other to generate signal loops;
    a first power combiner configured to combine the common TX ports of the plurality of transceiver units and connect the combined common TX ports to a transceiver chip;
    a second power combiner configured to combine the common RX ports of the plurality of transceiver units and connect the combined common RX ports to the transceiver chip;
    a processor configured to measure the signal loops and to calculate a ratio of a reception (RX) signal received by each antenna to an RX signal received by a reference antenna based on a result of the measuring; and
    a calibration circuit configured to perform calibration based on the ratio.

2. The array antenna calibration system of claim 1, wherein the processor is configured to measure a signal loop comprising an antenna connected to a transceiver in a transmission (TX) mode and an antenna connected to a transceiver in an RX mode.

3. The array antenna calibration system of claim 1, wherein:
    the processor is configured to measure a first signal loop and a second signal loop in which a second antenna and a third antenna receive signals transmitted by a first antenna through mutual coupling, to measure a third signal loop and a fourth signal loop in which the second antenna and the third antenna receive signals transmitted by a fourth antenna through mutual coupling, and to calculate a ratio of an RX signal received by the third antenna to an RX signal received by the second antenna based on results obtained by measuring the first signal loop through the fourth signal loop.

4. The array antenna calibration system of claim 1, wherein the calibration circuit comprises:
    a gain/attenuator circuit configured to perform calibration of an amplitude based on the ratio; and
    a phase shifter configured to perform calibration of a phase based on the ratio.

5. The array antenna calibration system of claim 1, wherein the calibration circuit is configured to perform row calibration of antennas of each of rows in the plurality of transceiver units based on a first antenna of each of the rows, and to perform column calibration of first antennas of the rows.

6. An array antenna system comprising:
    a plurality of transceiver units each including a common transmission (TX) port and a common reception (RX) port, wherein the plurality of transceiver units are arranged in a lattice form, and adjacent ones of the plurality of transceiver units are mutually coupled to each other to generate signal loops;
    a first power combiner configured to combine the common TX ports of the plurality of transceiver units and connect the combined common TX ports to a transceiver chip; and
    a second power combiner configured to combine the common RX ports of the plurality of transceiver units and connect the combined common RX ports to the transceiver chip,
    wherein each of the plurality of transceiver units comprises:
        a plurality of antennas arranged in a lattice form; and
        a transceiver.

7. The array antenna system of claim 6, wherein the transceiver comprises:
   a plurality of switches configured to select a path connected to each of the antennas; and
   a power combiner configured to combine the selected paths and to connect the combined paths to the common TX port or the common RX port.

8. The array antenna system of claim 6, wherein the plurality of antennas comprise patch antennas arranged at vertices.

* * * * *